United States Patent
Fox

(10) Patent No.: US 9,182,002 B2
(45) Date of Patent: Nov. 10, 2015

(54) TRAVEL CONTROL FOR A GAS SPRING AND GAS SPRING HAVING VERY SHORT TRAVEL MODES

(71) Applicant: Fox Factory, Inc., Watsonville, CA (US)

(72) Inventor: Robert C. Fox, Scotts Valley, CA (US)

(73) Assignee: Fox Factory, Inc., Watsonville, CA (US)

( * ) Notice: Subject to any disclaimer, the term of this patent is extended or adjusted under 35 U.S.C. 154(b) by 56 days.

(21) Appl. No.: 14/086,649

(22) Filed: Nov. 21, 2013

(65) Prior Publication Data

US 2014/0077427 A1 Mar. 20, 2014

Related U.S. Application Data

(63) Continuation of application No. 13/164,065, filed on Jun. 20, 2011, now Pat. No. 8,608,141, which is a continuation of application No. 11/669,862, filed on Jan. 31, 2007, now Pat. No. 7,963,509.

(51) Int. Cl.
*F16F 9/06* (2006.01)

(52) U.S. Cl.
CPC ..................................... *F16F 9/061* (2013.01)

(58) Field of Classification Search
CPC ........... F16F 9/061; F16F 9/064; F16F 9/065; F16F 9/068
USPC ........... 267/64.15, 64.25, 113, 118, 120, 124; 188/313, 314, 322.13
See application file for complete search history.

(56) References Cited

U.S. PATENT DOCUMENTS

| | | | |
|---|---|---|---|
| 865,151 A | 9/1907 | Andrew | |
| 1,094,567 A | 4/1914 | Hofmann | |
| 1,946,882 A | 2/1934 | Sherman | |
| 1,984,144 A | 12/1934 | Laugaudin | |
| 1,992,490 A | 2/1935 | Lewis | |
| 2,528,822 A | 11/1950 | Dunn | |
| 2,894,742 A | 7/1959 | Peterson | |
| 3,001,538 A | 9/1961 | Du | |
| 3,085,771 A | 4/1963 | Peterson | |
| RE29,055 E | 11/1976 | Wagner | |
| 4,206,934 A | 6/1980 | McKee | |
| 4,273,310 A | 6/1981 | Ginzler | |
| 4,390,159 A | 6/1983 | Duncan | |
| 4,452,177 A | 6/1984 | Plett et al. | |
| 4,457,340 A | 7/1984 | Krueger | |
| 4,534,580 A | 8/1985 | Kobayashi et al. | |

(Continued)

FOREIGN PATENT DOCUMENTS

CA 2222445 C * 11/2004
DE 725659 C 9/1942

(Continued)

OTHER PUBLICATIONS

"Cane Creek", Cane Creek—AD-10 and AD-12 literature (6 pages).

(Continued)

*Primary Examiner* — Thomas J Williams

(57) ABSTRACT

A gas spring capable of having long and short travel modes is described. The gas spring uses liquid in combination with pressurized air to affect the travel length. Unlike conventional gas springs, the gas spring according to the invention may have its travel reduced more than, for example, by 50%.

12 Claims, 17 Drawing Sheets

(56) References Cited

U.S. PATENT DOCUMENTS

| | | |
|---|---|---|
| 4,558,587 A | 12/1985 | Fruzzetti |
| 4,592,540 A | 6/1986 | Yokoya et al. |
| 4,598,929 A | 7/1986 | Kumagai et al. |
| 4,613,116 A | 9/1986 | Buma |
| 4,616,811 A | 10/1986 | Buma |
| 4,629,170 A | 12/1986 | Warmuth |
| 4,635,906 A | 1/1987 | Buma |
| 4,651,977 A | 3/1987 | Buma |
| 4,653,735 A | 3/1987 | Buma |
| 4,659,070 A | 4/1987 | Buma |
| 4,660,810 A | 4/1987 | Buma |
| 4,666,135 A | 5/1987 | Buma et al. |
| 4,667,696 A | 5/1987 | Van |
| 4,673,171 A | 6/1987 | Buma |
| 4,697,796 A | 10/1987 | Kitamura et al. |
| 4,735,401 A | 4/1988 | Buma et al. |
| 4,746,106 A | 5/1988 | Fukumura |
| 4,768,758 A | 9/1988 | Buma |
| 4,773,635 A | 9/1988 | Buma |
| 4,828,464 A | 5/1989 | Maier et al. |
| 4,838,306 A | 6/1989 | Horn et al. |
| 4,844,428 A | 7/1989 | Margolis et al. |
| 5,037,062 A | 8/1991 | Neuhaus |
| 5,067,517 A | 11/1991 | Ting-Chih et al. |
| 5,067,518 A | 11/1991 | Kosmyna |
| 5,111,735 A | 5/1992 | Johnson |
| 5,279,480 A | 1/1994 | Derrien et al. |
| 5,306,122 A | 4/1994 | Gebauer et al. |
| 5,346,236 A | 9/1994 | Ohma |
| 5,413,316 A | 5/1995 | Easter |
| 5,428,533 A | 6/1995 | Ogawa |
| 5,449,188 A | 9/1995 | Ohma |
| 5,470,090 A | 11/1995 | Stewart et al. |
| 5,538,276 A | 7/1996 | Tullis |
| 5,725,226 A | 3/1998 | Cabrerizo-Pariente |
| 5,775,677 A | 7/1998 | Englund |
| 5,915,674 A | 6/1999 | Wolf et al. |
| 5,921,572 A | 7/1999 | Bard et al. |
| 5,957,252 A | 9/1999 | Berthold |
| 6,010,119 A | 1/2000 | Hsiao |
| 6,050,583 A | 4/2000 | Bohn |
| 6,073,736 A | 6/2000 | Franklin |
| 6,095,541 A | 8/2000 | Turner et al. |
| 6,105,988 A | 8/2000 | Turner et al. |
| 6,135,434 A | 10/2000 | Marking |
| 6,149,125 A | 11/2000 | Nilsson |
| 6,149,174 A | 11/2000 | Bohn |
| 6,311,962 B1 | 11/2001 | Marking |
| 6,340,153 B1 | 1/2002 | Miesner |
| 6,343,807 B1 | 2/2002 | Rathbun |
| 6,464,201 B2 | 10/2002 | Job |
| 6,505,719 B2 | 1/2003 | Gonzalez et al. |
| 6,508,460 B2 | 1/2003 | Job |
| 6,543,799 B2 | 4/2003 | Miyoshi |
| 6,592,136 B2 | 7/2003 | Becker et al. |
| 6,595,537 B2 | 7/2003 | Miyoshi et al. |
| 6,612,599 B2 | 9/2003 | Miyoshi |
| 6,619,684 B2 | 9/2003 | Miyoshi |
| 6,669,219 B2 | 12/2003 | Turner et al. |
| 6,688,626 B2 | 2/2004 | Felsl et al. |
| 6,698,730 B2 | 3/2004 | Easter |
| 6,698,780 B2 | 3/2004 | Miyoshi |
| 6,708,803 B2 | 3/2004 | Jensen |
| 6,708,999 B1 | 3/2004 | Baltes et al. |
| 6,824,146 B2 | 11/2004 | Kang |
| 6,824,154 B1 | 11/2004 | Turner |
| 6,863,291 B2 | 3/2005 | Miyoshi |
| 6,883,810 B2 | 4/2005 | Svartz et al. |
| 6,938,887 B2 | 9/2005 | Achenbach |
| 6,974,001 B2 | 12/2005 | Bauman |
| 6,978,872 B2 | 12/2005 | Turner |
| 6,991,621 B2 | 1/2006 | Bacher et al. |
| 7,000,907 B2 | 2/2006 | Achenbach |
| 7,011,193 B2 | 3/2006 | Lemmens et al. |
| 7,017,893 B1 | 3/2006 | Vincenzo F. |
| 7,441,638 B2 | 10/2008 | Hanawa |
| 2003/0234144 A1 | 12/2003 | Fox |
| 2004/0262879 A1 | 12/2004 | Kinzler et al. |
| 2005/0012255 A1 | 1/2005 | Denk |
| 2005/0116399 A1 | 6/2005 | Jordan et al. |
| 2007/0057420 A1 | 3/2007 | Jordan et al. |
| 2008/0116622 A1* | 5/2008 | Fox .......................... 267/64.28 |

FOREIGN PATENT DOCUMENTS

| | | |
|---|---|---|
| DE | 1455159 A1 | 3/1969 |
| DE | 3233160 A1 | 3/1984 |
| DE | 3840352 A1 * | 6/1990 |
| DE | 4018712 A1 | 12/1991 |
| DE | 10236621 A1 | 3/2004 |
| DE | 10248253 A1 * | 4/2004 |
| DE | 102004021586 A1 | 12/2005 |
| DE | 102010020057 * | 1/2011 |
| EP | 101589 A1 | 2/1984 |
| EP | 164189 A1 | 12/1985 |
| EP | 166702 A2 | 1/1986 |
| EP | 474171 A1 | 3/1992 |
| EP | 1464866 A2 | 10/2004 |
| ES | 8608123 A1 | 11/1986 |
| FI | 931949 A | 4/1993 |
| FR | 1174491 A | 3/1959 |
| FR | 2684957 A1 * | 6/1993 |
| FR | 2728948 A1 | 7/1996 |
| FR | 2753510 A1 | 3/1998 |
| FR | 2800702 A1 * | 5/2001 |
| FR | 2863328 A1 | 6/2005 |
| GB | 835151 A | 5/1960 |
| GB | 2206645 A * | 1/1989 |
| GB | 2265435 A | 9/1993 |
| IT | 1237933 B | 6/1993 |
| IT | 1247985 B | 1/1995 |
| JP | 57018509 Y2 | 4/1982 |
| JP | 59026639 A | 2/1984 |
| JP | 61135808 A | 6/1986 |
| JP | 61235212 A | 10/1986 |
| JP | 07167189 A | 7/1995 |
| SU | 623759 A1 | 9/1978 |
| WO | 9910223 A1 | 3/1999 |
| WO | 03029687 A1 | 4/2003 |
| WO | 2004016966 A1 | 2/2004 |
| WO | 2004041563 A1 | 5/2004 |

OTHER PUBLICATIONS

"Fox Factory", Fox Factory—DHX, Fox Factory 2008 Aftermarket Catalog (2 pages).

"Motorcycle Cruiser—"How to Improve the Ride and Suspension Performance of Cruiser Motorcycles"", Motorcycle Cruiser—"How to Improve the Ride and Suspension Performance of Cruiser Motorcycles", www.motorcyclecruiser.com/tech/improve_ride_suspension_performance, 2006 (2 pages).

"Motoxcross Museum—"The History of Fox Air Shocks"", Motoxcross Museum—"The History of Fox Air Shocks", 2001 (9 pages).

"Risee Racing Technology—"Remote Adjustable Air Chamber"", Risee Racing Technology—"Remote Adjustable Air Chamber", Webpage 1999/2005 (2 pages).

"Rock Shox", Rock Shox—Fork SID Manuals, 1998-2000 (15 pages).

"Sport Rider—"Suspension Tuning Guide—Learning the Lingo"", Sport Rider—"Suspension Tuning Guide—Learning the Lingo", www.sportrider.com/tech/146.0006.susp_lingo (2 pages).

Gieck, "Riding on Air: A History of Air suspension, Society of Automotive Engineers", Riding on Air: A History of Air suspension, Society of Automotive Engineers, Inc., 1999 (p. 222), p. 222.

Rosso, "How to Set KTM Fork Oil Level", Rosso, Mike—"How to Set KTM Fork Oil Level", www.4Strokes.com (1 page).

Sieman, "Do it Yourself Tech—Dial in Your Forks", Sieman, Rick—"Do it Yourself Tech—Dial in Your Forks", www.off-road.com/dirtbike/tech/forks, Jul. 1, 2005 (6 pages).

\* cited by examiner

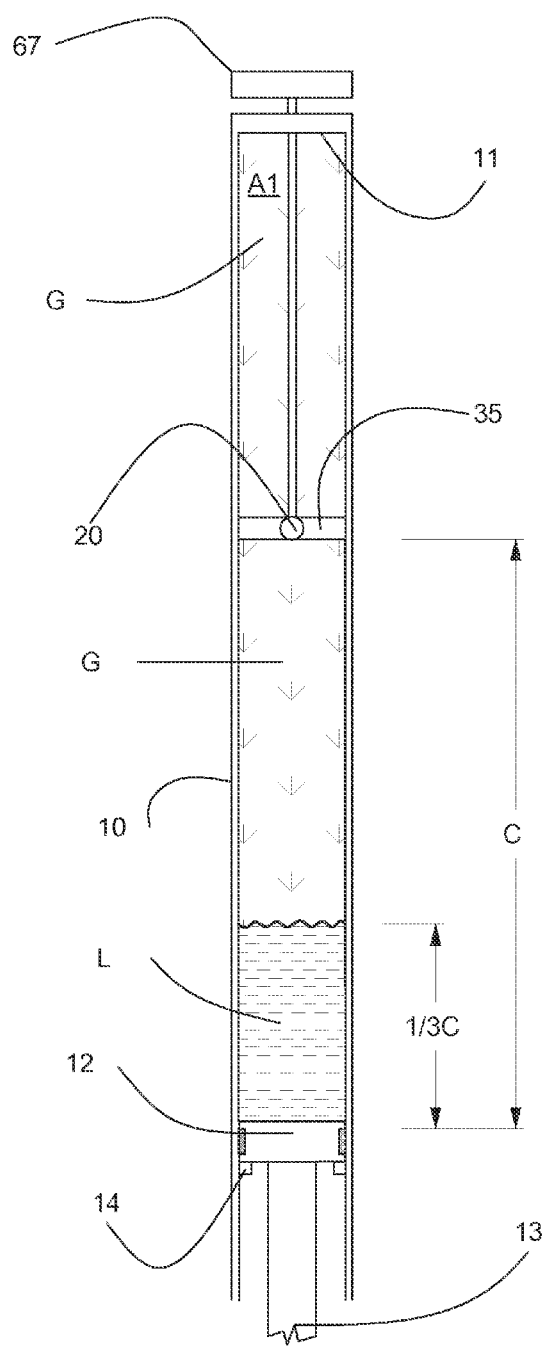

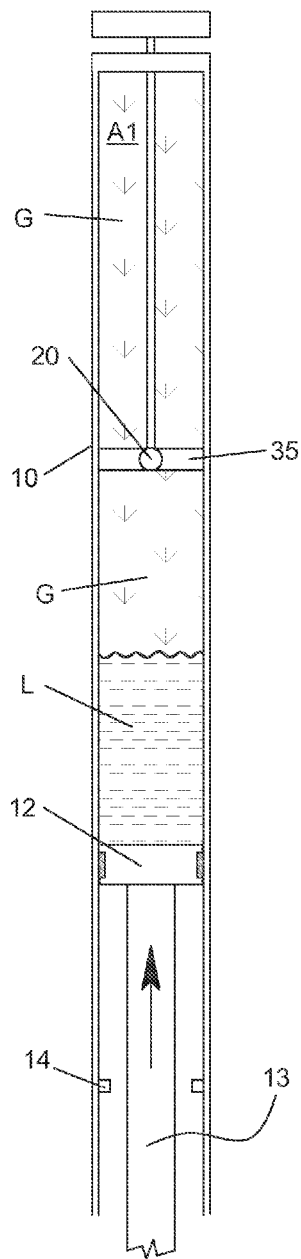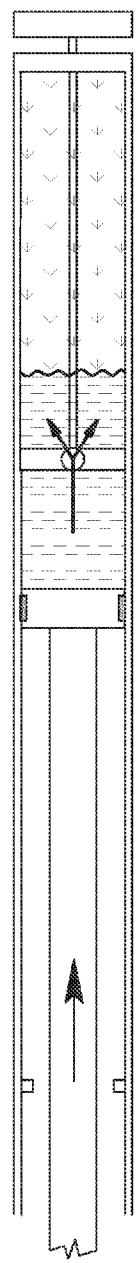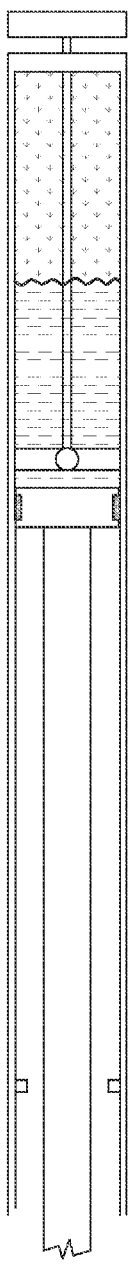

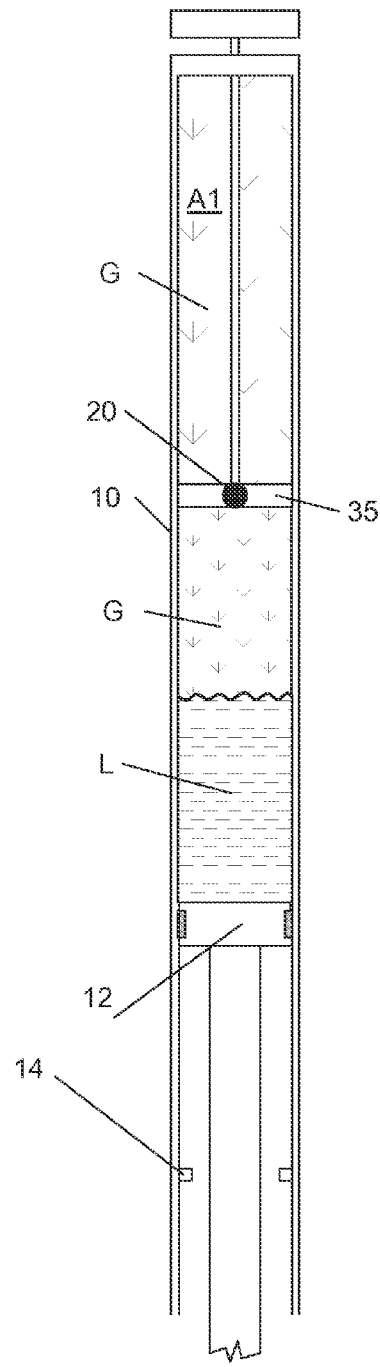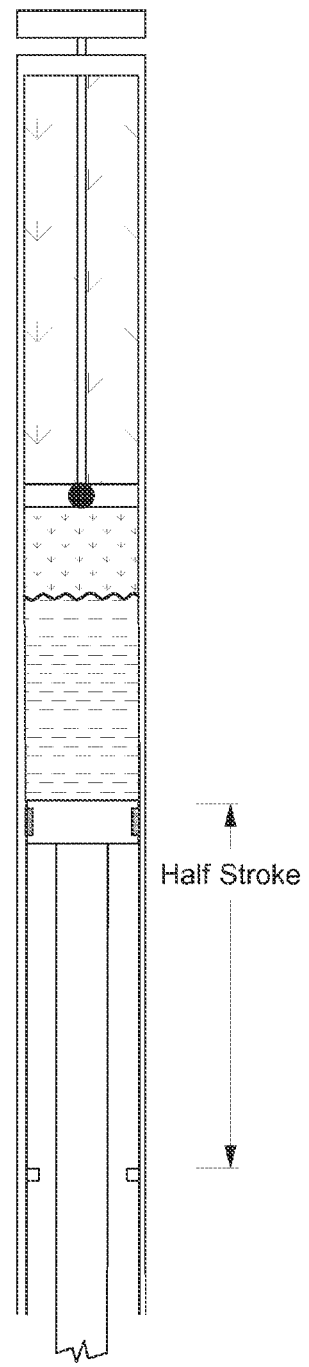

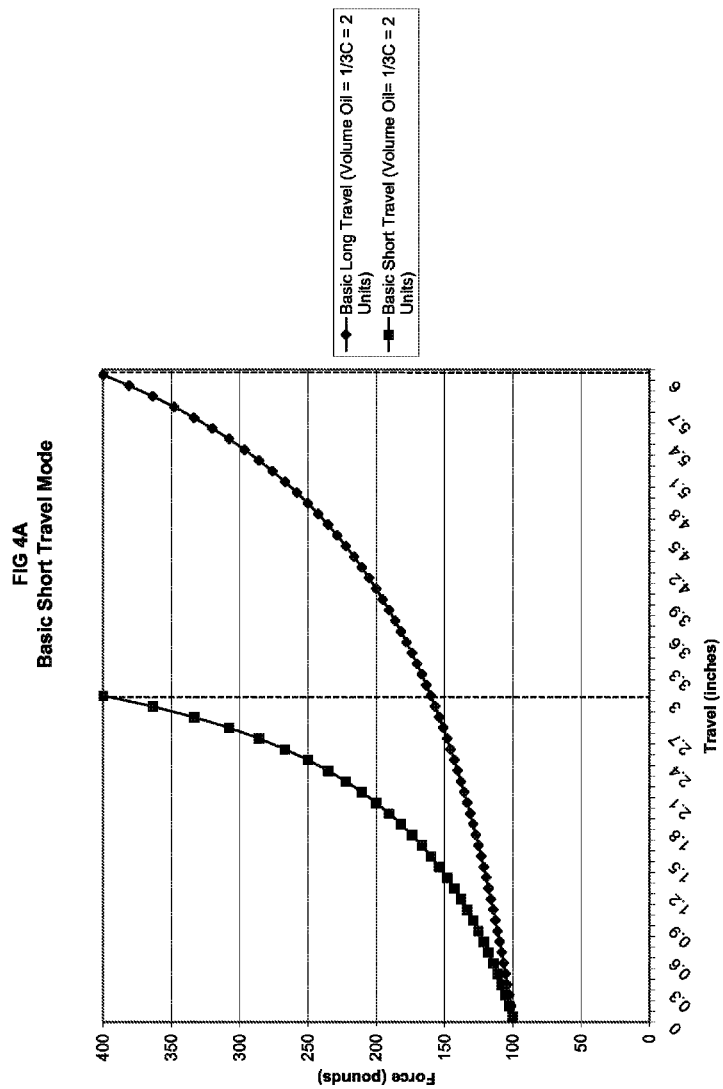

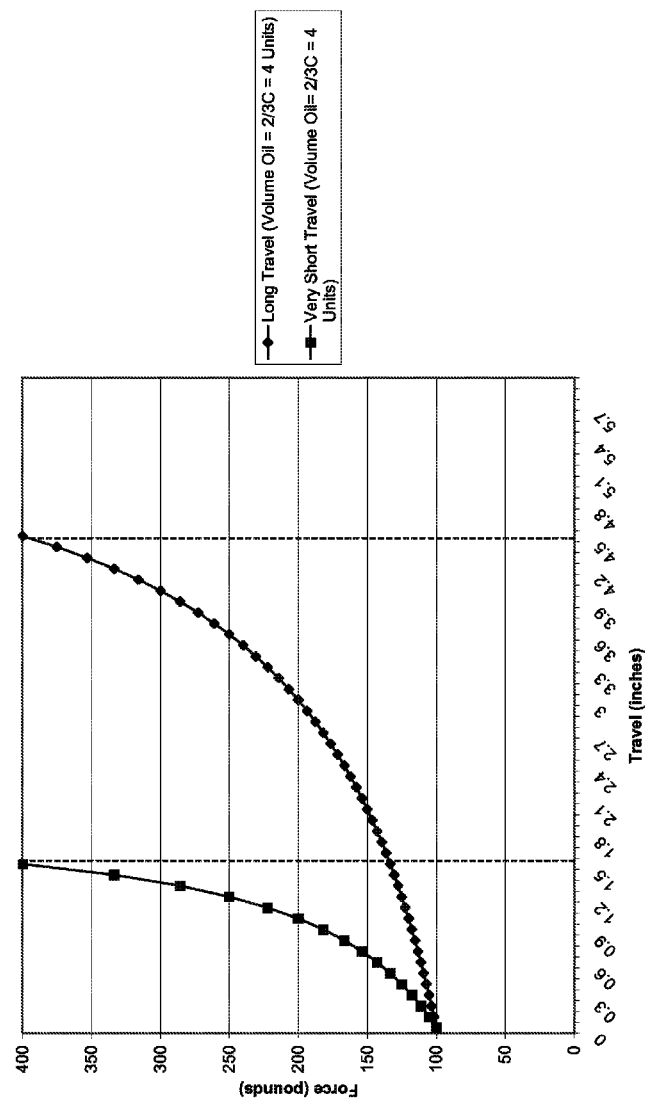

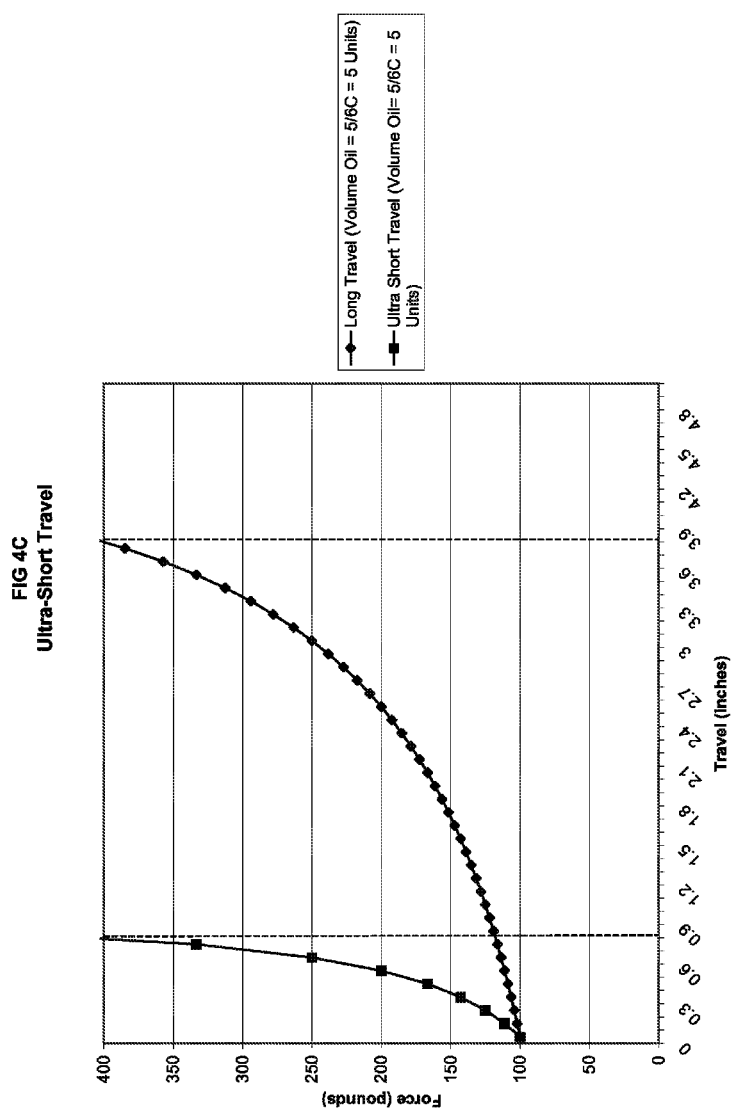

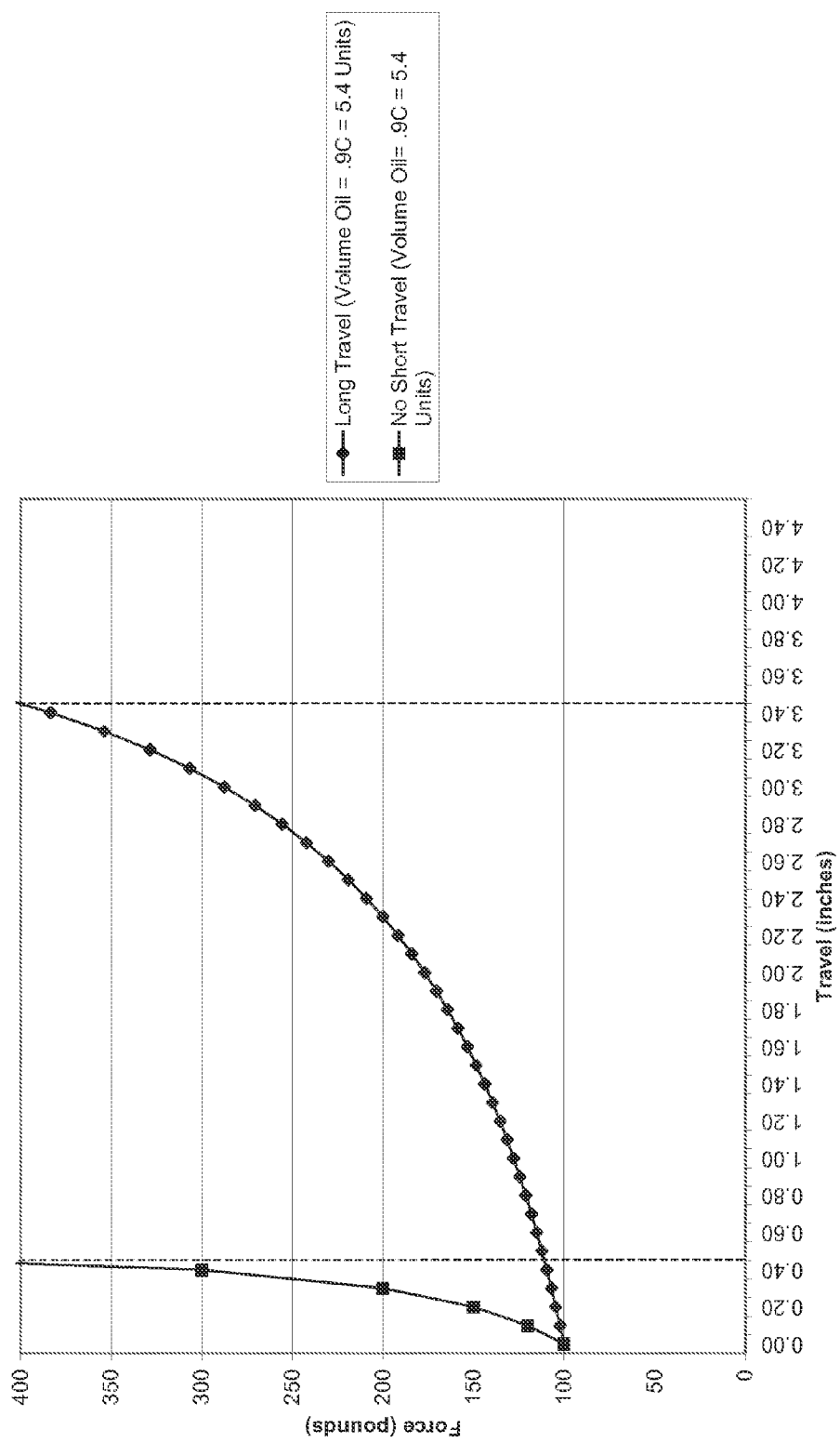

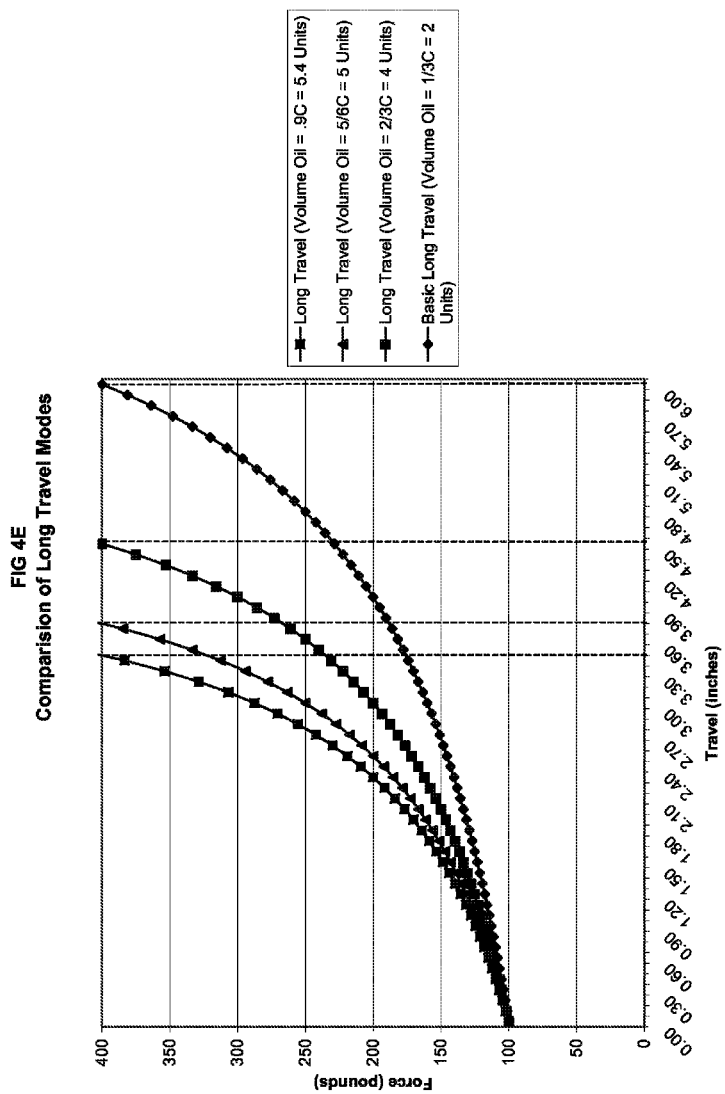

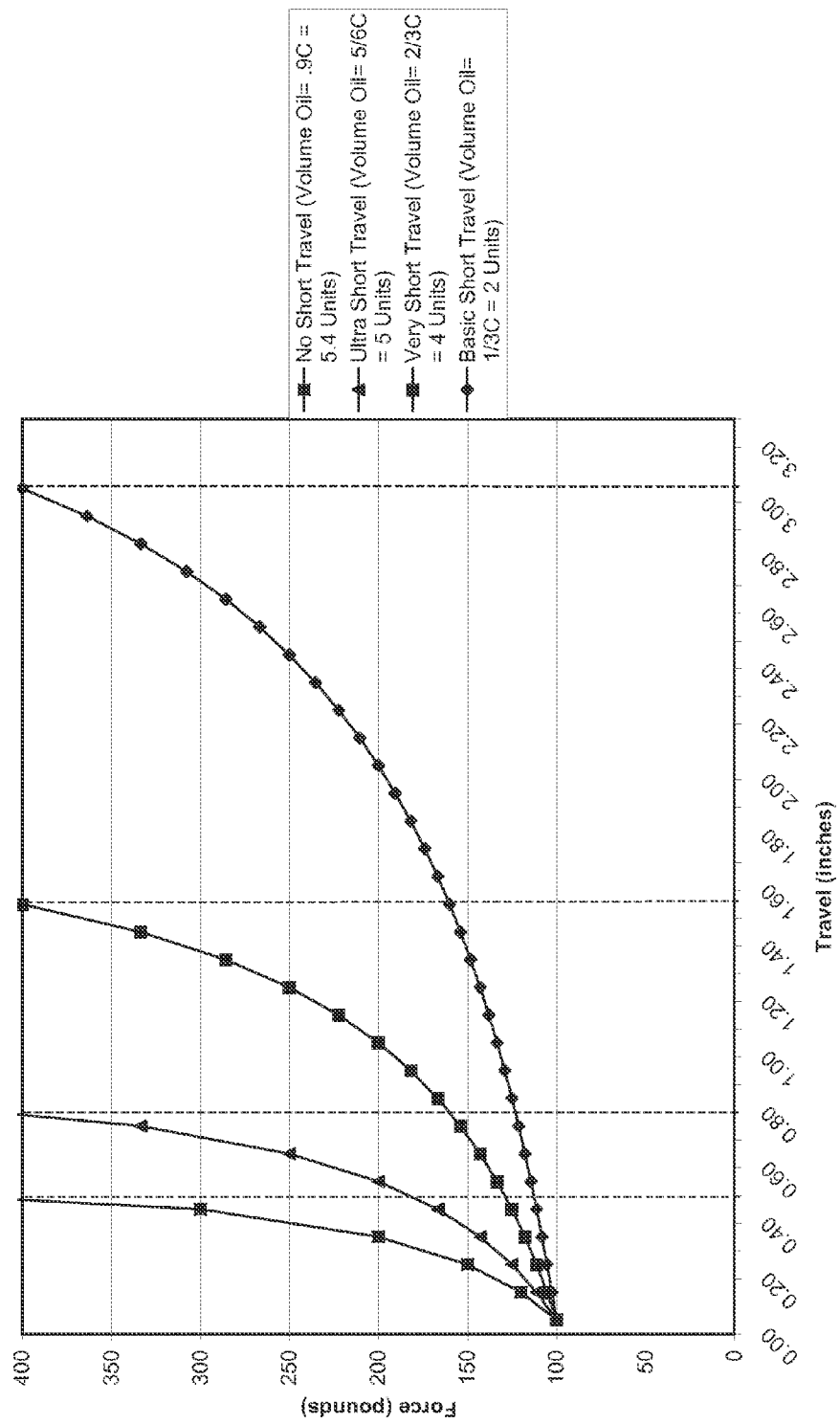

Basic Short

Very Short

Ultra Short

Substantially No
Short Travel

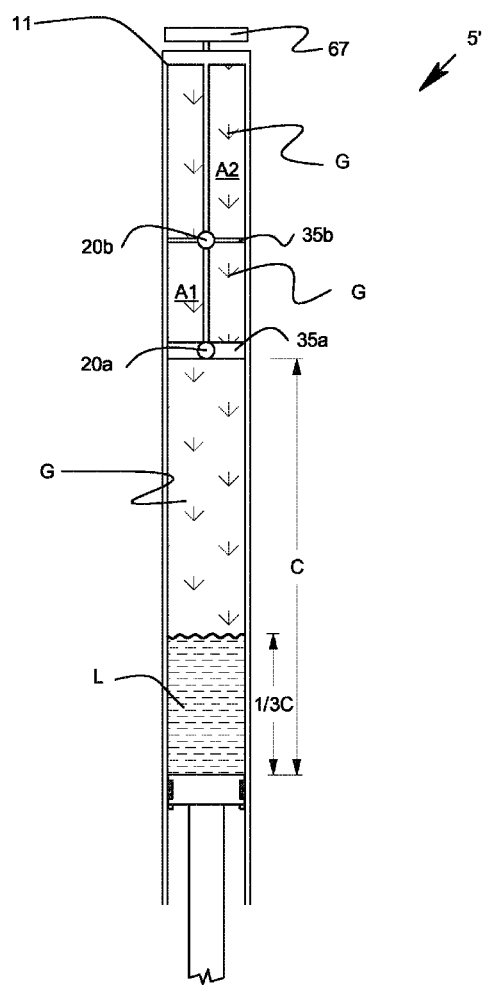

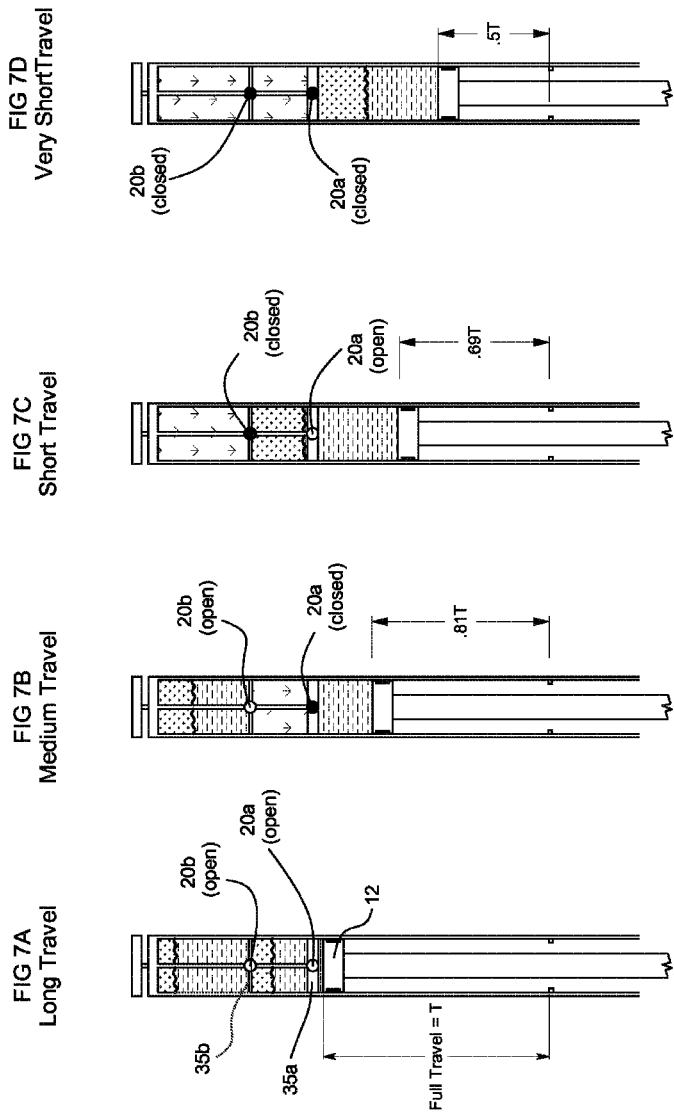

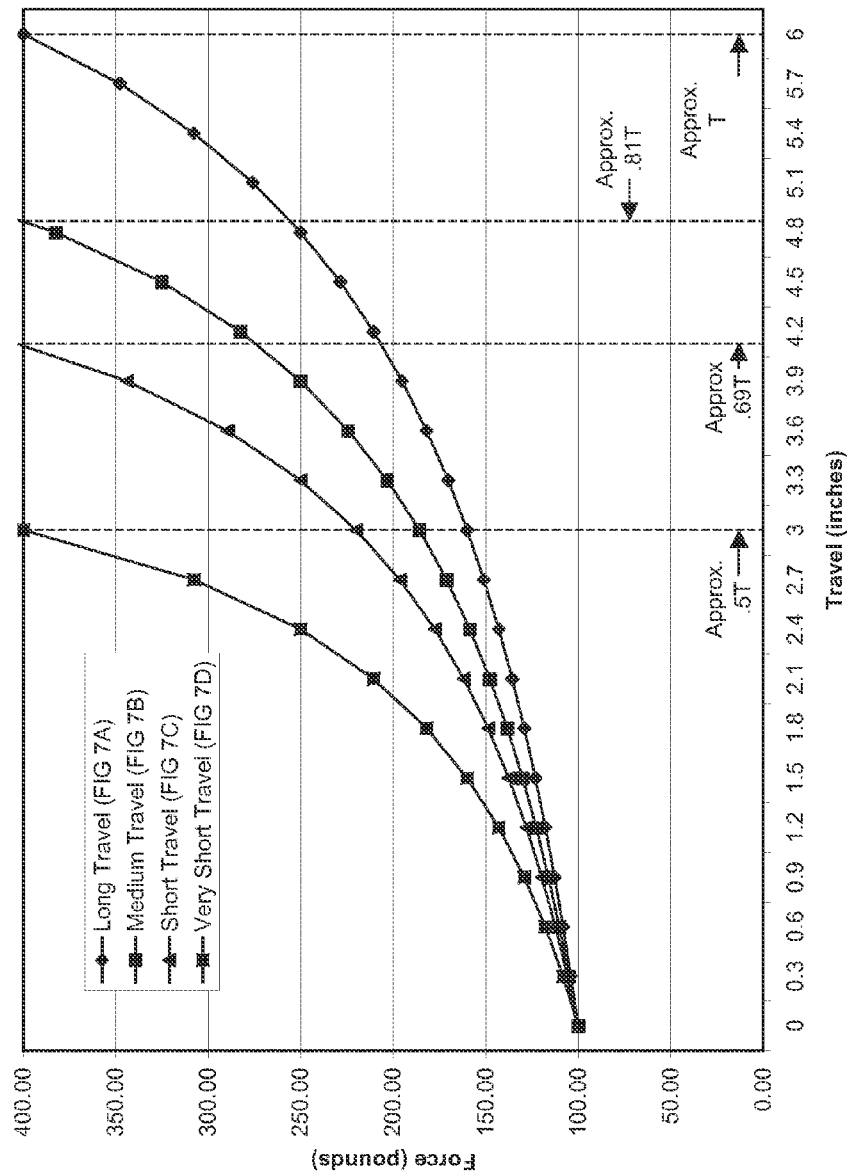

Long Travel

Medium Travel

Short Travel

Very Short Travel

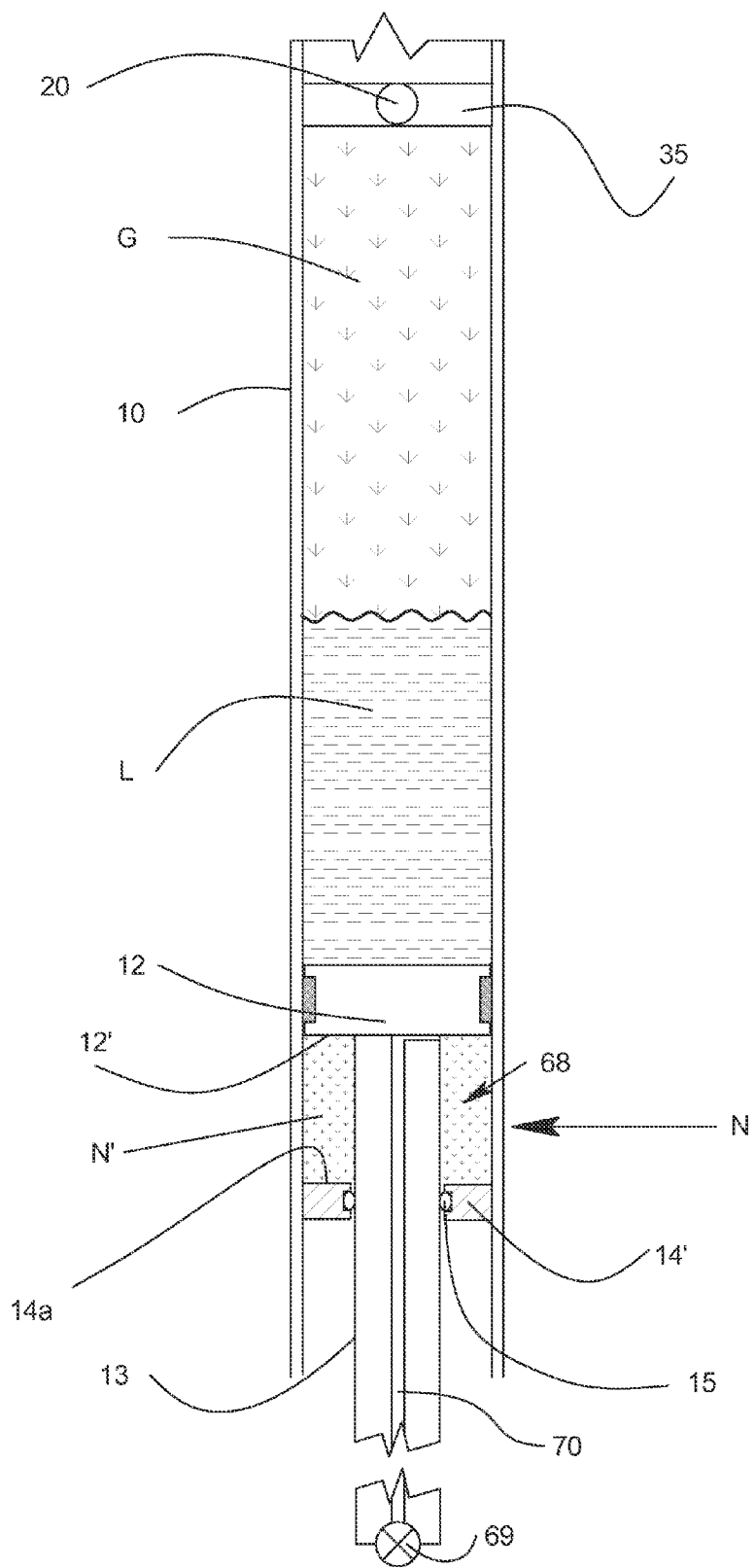

TRAVEL CONTROL FOR A GAS SPRING AND GAS SPRING HAVING VERY SHORT TRAVEL MODES

CROSS-REFERENCE TO RELATED APPLICATIONS

This application is a continuation application of and claims the benefit of co-pending U.S. patent application Ser. No. 13/164,065 filed on Jun. 20, 2011 entitled "TRAVEL CONTROL FOR A GAS SPRING AND GAS SPRING HAVING VERY SHORT TRAVEL MODES" by Robert C. Fox, which is incorporated herein, in its entirety, by reference, which application is a continuation application of U.S. patent application Ser. No. 11/669,862 filed on Jan. 31, 2007 entitled "TRAVEL CONTROL FOR A GAS SPRING AND GAS SPRING HAVING VERY SHORT TRAVEL MODES" by Robert C. Fox, which is incorporated herein, in its entirety, by reference.

This application is related to our U.S. patent applications: a) Ser. No. 10/237,333, filed Sep. 5, 2005, published as U.S. Pub. 2003/0234144 (the "'144 application") on Dec. 25, 2003, and entitled "On the Fly Adjustable Gas Spring"; b) Ser. No. 11/372,707, filed Mar. 10, 2006, and entitled "Gas Spring and Travel Control For Same and Method"; and c) Ser. No. 11/560,403, filed Nov. 16, 2006, and entitled "Gas Spring Curve Control In An Adjustable-Volume Gas-Pressurized Device" (the "'403 application"). All patents and patent applications referred to herein are incorporated by reference into this patent application.

BACKGROUND OF THE INVENTION

1. Field of the Invention

The current invention is generally directed to improvements useful in gas-spring devices employed in, for example, two-wheeled vehicle suspension elements such as: shock absorbers, suspension forks and other variable-volume gas-pressurized devices ("gas springs").

2. Description of the Related Art

As described in detail in the '144 application and summarized in the '403 application, the stiffness (force-versus-travel or, as used herein, "spring curve") of a gas spring may be associated with "travel modes" (e.g. long and short). For example, as depicted in the two spring curves of FIG. 15 of the '144 application and described in para [0008] of the '144 application, travel modes are indicative of how far a spring compresses when subjected to a given compression force (i.e., a gas spring will compress more in long travel mode than in short travel mode). For example, for the gas spring described in the '144 application, in the long travel mode (FIG. 13), the amount of travel produced by a 750 pound force is approximately 1.75". In the short travel mode (FIG. 14), the amount of travel produced by the same force is approximately 1.27". Note that for the reasons described in para [0063] of the '144 application, all pressure values are dose approximations and effected by the presence of the negative gas spring.

In the '144 application, selection between the long and short travel modes is easily accomplished on the fly by a rider making a small (e.g. ¼) turn of an adjustment knob and without all the disadvantages of prior art methods for changing travel length (see discussion of prior art in the '403 application). In the '144 application there are two gas chambers. The long travel mode is operative when the two gas chambers are in fluid communication with each other. The short travel mode is operative when the two gas chambers are not in fluid communication with each other.

Although the gas spring as shown in the '144 application is capable of producing two available travel modes, it is often desirable to have more than two available travel modes—as described in the '403 application. Furthermore, it may often be desirable for the short travel mode to produce a substantially shorter travel length than has been so far provided such that for a given force, the distance between the travel limits of the long and short travel modes are spaced further apart, e.g., approximately 50% or more, or in other words, the travel in the short travel mode is approximately 50% or less of the travel in the long travel mode.

Finally, in general, by providing a rider with the ability to control suspension travel, riders have a tool for controlling the stiffness of the gas spring and the magnitude of the force that would cause a harsh bottom-out and uncomfortable metal-to-metal contact. Furthermore, by providing rider with a wide range of travel mode options, the suspension can, for example, be optimized for: (a) more consistent tire contact patch (lower gas spring stiffness); (b) more comfortable ride (lower gas spring stiffness); (c) increased pedal efficiency (reduced pedal bob) (stiffer gas spring); and (d) reduced fore-aft pitching (stiffer gas spring).

Therefore, there is room for improvement within the art.

SUMMARY OF THE INVENTION

In one embodiment, a gas spring for a two-wheeled vehicle includes: a main chamber and at least one auxiliary chamber; a control valve for controlling whether the main chamber and the at least one auxiliary chamber are in fluid communication with each other; a volume of liquid filling a portion of the main chamber at full expansion; pressurized gas filling the at least one auxiliary chamber and the remaining portion of the main chamber; and a movable piston for compressing the gas in the main chamber and displacing the liquid during a compression stroke of the gas spring.

BRIEF DESCRIPTION OF THE DRAWINGS

Due to the extensive use of schematic drawings herein, reference numerals have not always been repeated from FIG to FIG when not necessary to an understanding of the FIG or the invention. Furthermore, throughout the FIGs, cross-hatching density is used to symbolically represent relative gas pressures (see FIG. 1A). Therefore, an area containing less dense cross-hatching has a lower gas pressure than an area having denser cross-hatching. Generally, cross-hatching of structural components has been minimized to minimize confusion with symbolized "pressure cross-hatching".

Additionally: a) as in the '403 application, filled circles represent closed valves and empty circles represent open valves; and b) where possible, reference numerals from the '403 application have been used herein.

FIG. 1A depicts the relationships between representative exemplary pressures and their corresponding cross-hatching density.

FIG. 1B schematically depicts the gas spring of the '144 application modified according to a first exemplary embodiment of the current invention and at full expansion.

FIGS. 2A-2C schematically depict the operation of the modified gas spring of FIG. 1B at different positions in the stroke, when in long travel mode.

FIGS. 3A-3B schematically depict the operation of the modified gas spring of FIG. 1B at different positions in the stroke, when in short travel mode.

FIG. 4A depicts the long travel and short travel spring curves produced by the modified gas spring of FIG. 1B in a manner similar to the spring curves depicted in FIG. 15 of the '144 application.

FIGS. 4B, 4C, 4D depict the different long and short travel spring curve combinations that may be produced by the modified gas spring of FIG. 1B when the amount of liquid in the gas spring is varied.

FIG. 4E compares the different long travel spring curves that may be produced by the modified gas spring of FIG. 1B when the amount of liquid in the gas spring is varied.

FIG. 4F compares the different short travel spring curves that may be produced by the modified gas spring of FIG. 1B when the amount of liquid in the gas spring is varied.

FIG. 6 schematically depicts an alternative exemplary embodiment of a modified gas spring according to the invention, at full extension, and having two auxiliary chambers.

FIGS. 7A-D depict the gas spring of FIG. 6 in each of the four travel modes, respectively, and at their respective travel positions when subjected to the same maximum pressure.

FIG. 8 is a graph depicting the spring curves produced in each of the four travel mode settings of FIGS. 7A-D.

FIG. 15 depicts a basic partial schematic layout of an exemplary embodiment of the invention including an exemplary negative gas spring.

DETAILED DESCRIPTION

Basic Structure of an Exemplary Embodiment of the Invention

FIG. 1B schematically depicts the gas spring of the '144 application modified according to an exemplary embodiment of the current invention, at full extension, and without a negative gas spring. While in many instances it may be advantageous to have a negative gas spring and one skilled in the art would be aware that a negative air spring can be used with the exemplary embodiments of the present invention, for purposes of simplifying the bulk of the current discussion and its associated calculations, the negative gas spring and its associated effects have been omitted. However, FIG. 15 (discussed later) depicts a basic partial schematic layout of an exemplary embodiment of the invention including an exemplary negative gas spring.

Figure 9D:
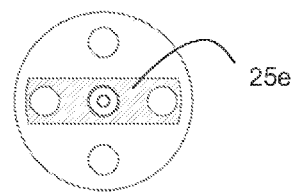
FIGS. 9A-F are different views of an exemplary physical embodiment of a gas spring control valve according to the invention, as modified from an exemplary embodiment of the '403 application.
Figure 9F:
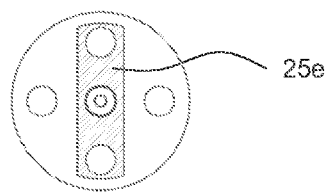
Figure 9A:
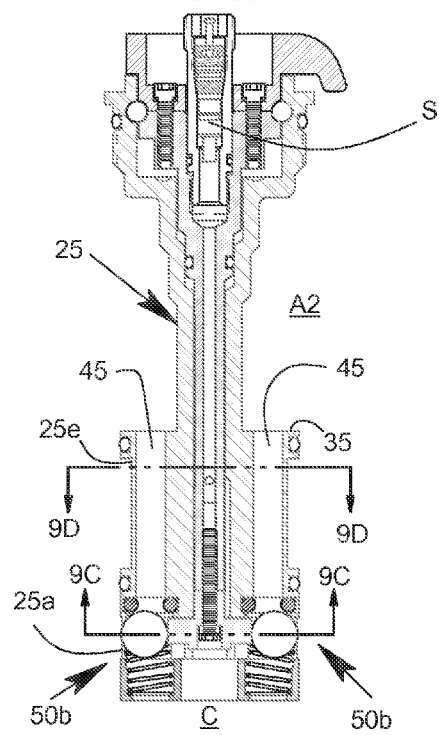
Figure 9B:
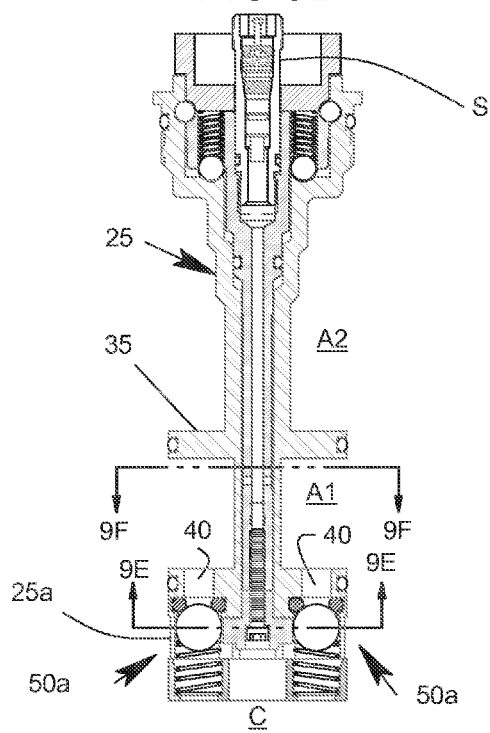

As schematically shown in FIG. 1B, gas spring 5 includes a gas spring housing 10 enclosing a main chamber C and one auxiliary chamber A1. Main chamber C is defined as the volume between partition 35 and piston 12 at full expansion. Auxiliary chamber A1 is defined as the volume between partition 35 and the upper end 11 of gas spring housing 10. Thus, the two chambers may be separated from each other by partition 35, which itself may have a valve 20. Valve 20 allows the user to selectively place the two chambers in fluid communication using a controller, such as a knob 67 positioned externally of the gas spring housing 10 and preferably within the easy reach of a mounted rider for easy on-the-fly manipulation. Gas spring housing 10 may be a portion of a suspension element, such as a shock absorber, suspension fork leg, or other damper. Furthermore, when the piston 12 is fully retracted, a volume of liquid L, such as oil or any other fluid that will not degrade internal seals, etc., is added to partially fill main chamber C. Liquid L sits on piston 12, which itself is supported by piston shaft 13. For the purposes of the upcoming basic exemplary embodiment of the invention, it is assumed that the volume of liquid L fills approximately ⅓ the volume of main chamber C. Liquid L may be added during manufacture of the gas spring 5 and subject to routine maintenance only, or to change the travel mode travel limits as will be described below-need not be bothered with by the rider. This is different from, for example, related art damper designs, such as extensively discussed in the '403 application, which require the user to change the liquid level or the position of an internal component each time the rider wants to change the gas spring curve. Finally, gas spring 5 is sealed and pressurized through a conventional pressurization valve S (see FIGS. 9A-9B) with a gas G (see description of pressurization in the '403 application) such that the gas pressures in main chamber C and auxiliary chamber A1 are equal.

Schematic Depiction of Long Travel Mode Operation

FIG. 2A-2C depict the modified gas spring according to this first exemplary embodiment of the invention and operating in long travel mode.

First, as described in the '144 and '403 applications, in the long travel mode, valve 20 is placed in its open position so that main chamber C and auxiliary chamber A1 are in fluid communication with each other. As previously mentioned, the gas pressures in main chamber C and auxiliary chamber A1 are equal.

In FIG. 2A, the gas spring 5 has begun to compress through its travel (note distance between piston 12 and piston stops 14). The liquid L is carried by the inwardly moving piston 12 and as the volume of gas G in the communicating main chamber C and auxiliary chamber A1 decreases, the gas pressure within communicating gas chambers C and A1 increases.

In FIG. 2B, the spring has compressed through its travel to a point where the volume between the piston 12 and partition 35 was no longer able to contain the full volume of liquid L. Therefore, a portion of the liquid L passed through open valve 20 and into auxiliary chamber A1. At this point, all the gas that was previously between the piston 12 and partition 35 has been displaced into auxiliary chamber A1 and the pressure of the gas has further increased as symbolized by the denser cross-hatching of FIG. 2B.

Finally, if gas spring 5 is constructed according to the parameters of TABLE ONE, as shown in FIG. 2C, the volume between the piston 12 and partition 35 will decrease to substantially zero (size exaggerated for clarity and to symbolize the lack of metal-to-metal contact) and all the gas and substantially all the liquid that were between the piston 12 and partition 35 will be in auxiliary chamber A1 (accordingly, the volume of the auxiliary chamber should be equal to or greater than the volume of the liquid to allow full travel in long travel mode). The pressure of the gas, of course, has increased as symbolized by the denser cross-hatching of FIG. 2C relative to FIGS. 2A and 2B.

Schematic Depiction of Short Travel Mode Operation

FIGS. 3A and 3B are discussed next. Note that in these figures—in contrast to FIGS. 2A-C—valve 20 is in its closed position (expressed again by filled in circles). With valve 20 closed, the gas spring 5 is in the short travel mode because main chamber C and auxiliary chamber A1 are not in fluid communication with each other.

As shown in FIG. 3A, the gas spring 5 has begun to compress through its travel (note distance between piston 12 and piston stops 14). The liquid L is carried by the inwardly moving piston 12 and as the volume of the gas between the piston 12 and partition 35 decreases, the pressure of the gas G between the piston 12 and partition 35 increases. However, because valve 20 is closed, the gas pressure in auxiliary chamber A1 remains constant and is irrelevant to this mode of operation. Thus, the hatching of the gas G between the piston 12 and partition 35 is denser than the hatching of the gas in auxiliary chamber A1.

FIG. 3B depicts how, at some point during the compression stroke, the increased pressure of gas G between the piston 12 and partition 35 will reach a value that precludes substantially any additional compression. As described below and generally depicted by FIG. 3B, the gas spring 5 may be designed so that the point at which substantially no additional compression occurs can be approximately 50% of full travel.

Graphical Depiction of Short and Long Travel Operation

The spring curves of FIG. 4A illustrate the spring curves produced by the gas spring 5 of FIG. 1B in each of its two different selectable modes: the short-travel mode and the long-travel mode. The spring curves of FIG. 4A result from the following initial gas spring conditions:

TABLE ONE

Initial Gas Spring Conditions (piston at full expansion)

Volume of main chamber C = 6 units.
Volume of auxiliary chamber A1 = 4 units.
Volume of liquid in the main chamber ≈ ⅓ volume of the main chamber (i.e. 2 units). Therefore, at full extension, liquid and gas fill the main chamber.
Maximum Available Stroke = 6 units.
Piston area = 1 square unit.
Initial Internal Gas Pressure = 100 PSI NOTE:
One skilled in the art would recognize that units should come from a single consistent system of measurement.

As depicted by the long travel mode spring curve of FIG. 4A, the force produced by the gas spring as exemplified by FIGS. 2A-2C rises somewhat gradually and reaches, in this example, a value of 400 pounds at a stroke distance of about 6 inches (i.e., full travel) (FIG. 2B). As depicted by the short-travel mode spring curve of FIG. 4A, the force produced by the gas spring as exemplified by FIGS. 3A-3B rises more rapidly and reaches, in this example, a value of 400 pounds at a stroke distance of about 3 inches (i.e., half travel) (FIG. 3B).

As those skilled in the art will recognize, these exemplary force and stroke values are based on, for example, the parameters of TABLE ONE. However, as those skilled in the art will recognize, a theoretically infinite number of combinations of areas and pressures can produce the force values in this example.

Modified Short Travel Modes

Figure 5A:
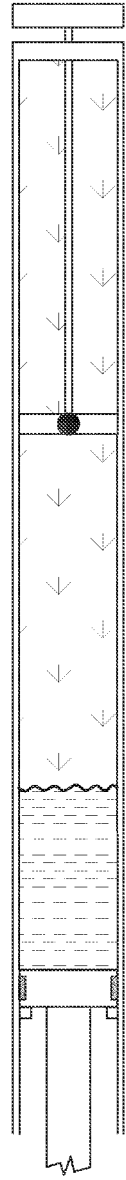
FIGS. 5A-5D depict how the amount of liquid within the gas spring can be changed to alter the short travel mode (all shown at full expansion).
Figure 5B:
Figure 5C:
Figure 5D:
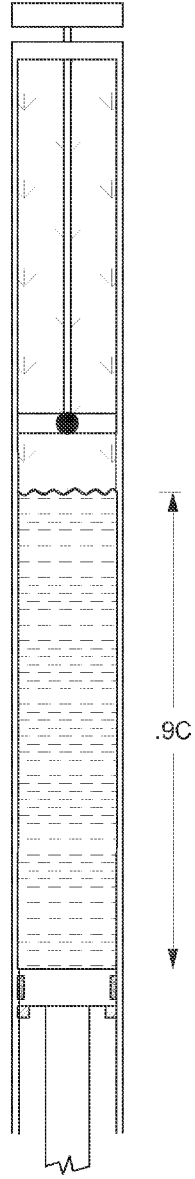

FIGS. 4B, 4C, and 4D depicts the complementary long and short travel gas spring curves produced by the exemplary embodiments of FIGS. 5B-D, respectively, The complementary long and short travel gas spring curves produced by the exemplary embodiment of FIG. 5A is shown in FIG. 4A. In a two travel mode gas spring, such as described with references to FIGS. 1B, 2A-2C, 3A-3B and 5A-5D, the gas spring 5 would be provided with one valve setting for long travel and one valve setting for one of, for example, "basic" short, "ultra-short" or "very-short", or "substantially no short" travel.

Alternative short travel modes, such as very-short, ultra-short, and substantially no short travel may be easily produced by varying the amount of liquid L in the main chamber C as summarized in TABLE TWO, when all the other initial gas spring conditions described in TABLE ONE are kept constant:

TABLE TWO

| Short Travel Mode | FIG. | Volume of Oil at Full Expansion |
| --- | --- | --- |
| Basic Short | 4A, 5A | ⅓ C (2 units) |
| Very Short | 4B, 5B | ⅔ C (4 units) |
| Ultra-Short | 4C, 5C | ⅚ C (5 units) |
| Substantially No Short Travel | 4D, 5D | .9 C (5.4 units) |

As can be seen in FIGS. 4E, 4F, increasing the volume of the liquid in main chamber C from ⅓ the fully expanded volume of main chamber C to 0.9 the volume of main chamber C causes the short and long travels of gas spring 5 to decrease significantly. As these travels decrease, the force produced by the gas spring 5 rises from rapidly (basic short travel) to extremely rapidly (substantially no-short travel).

Alternative Embodiment

While the '144 application and the previously described exemplary embodiment of the invention use one main and one auxiliary chamber to provide two travel settings, i.e., long and short travel modes, the '403 application uses one main and two auxiliary chambers to provide four discrete travel mode settings. The user may select from among the various available settings on-the-fly, for example, by manipulating a controller. According to the current invention, and using the teachings of the '403 application, four user selectable travel mode settings may also be provided in an alternative exemplary embodiment of the current invention. Therefore, for example, FIG. 6 depicts a schematic version of a fully expanded gas spring according to an exemplary alternative embodiment of the invention applying the teachings of the '403 application.

In particular, the gas spring is provided with a first auxiliary chamber A1 defined between partition 35a and partition 35b and a second auxiliary chamber defined between partition 35b and upper end 11 of the gas spring housing. Furthermore, auxiliary chambers A1, A2 may be selectively placed into fluid communication with main chamber C using controller 67 to adjust the settings of valves 20a, 20b. While in the '403 application, only gas is displaced among the various gas chambers when they are in fluid communication, according to this alternative exemplary embodiment of the invention, both gas and liquid may be displaced among the various gas chambers depending upon the settings of valves 20a, 20b. Note that as FIG. 6 is a schematic, valves 20a, 20b, may take any form and even be part of a single valve assembly (see e.g. FIG. 11A-B, 12A-D, 13, 14A-C, where a single rotary disk valve is shown).

FIG. 7A-D schematically depict the operation of the gas spring according to this alternative exemplary alternative embodiment of the invention: a) with the design parameters described in TABLE THREE, below; b) in each of its four travel mode settings, respectively, as will be described below; and c) at the point in the travel of piston 12 where the pressure of the gas acting on the face of the piston 12 has increased to the same level (e.g. 400 psi) in each setting.

In particular:

Long travel mode—FIG. 7A)—Valves 20a and 20b are open and the inwardly moving piston 12 displaces all the liquid L and all the gas G that were in the main chamber C into the first and second auxiliary chambers A1, A2 to the point where the pressure of the gas increases to about 400 psi. In this exemplary embodiment, this occurs at, full travel (distance between piston 12 and partition 35 exaggerated for detail and to symbolize lack of metal-to-metal contact); and (Medium travel mode—FIG. 7B)—Valve 20b is open and valve 20a is dosed and the inwardly moving piston displaces all the gas G and some of the liquid L that were in the main chamber C into the second auxiliary chamber A2 until the pressure of the gas increases to about 400 psi; and Short travel mode—FIG. 7C)—Valve 20a is open and valve 20b is dosed and the inwardly moving piston displaces all the gas G and some of the liquid L that were in the main chamber C into the first auxiliary chamber A1 until the pressure of the gas increases to about 400 psi; and (Very short Travel mode—FIG. 7D) Valves 20a and 20b are dosed and the inwardly moving piston compresses the gas G in the main chamber C until the pressure of the gas G in the main chamber C increases to about 400 psi.

FIG. 8 depicts an exemplary family of gas curves that may correspond to the long, medium, short, and very short travel modes summarized immediately above. As can be seen in FIG. 8, as the setting of the gas spring 5 changes from long travel mode to very short travel mode, the travel produced by a given force decreases. The operation of this exemplary embodiment when subjected to a 400 pound force in each travel setting is summarized in TABLE THREE below.

TABLE THREE

| FIG. | Controller Setting | Travel Mode | Valve 20a | Valve 20b | Chambers Used | Exemplary Travel Position Resulting from a 400 pound Force |
|------|--------------------|-------------|-----------|-----------|---------------|------------------------------------------------------------|
| 7A | 1 | Long | Open | Open | C, A1, A2 | T |
| 7B | 2 | Medium | Closed | Open | C, A2 | .81T |
| 7C | 3 | Short | Open | Closed | C, A1 | .69T |
| 7D | 4 | Very Short | Closed | Closed | C | .5T |

Assumptions at Full Expansion:
Volume main chamber C = 6
Volume first auxiliary chamber A1 = 1.5
Volume second auxiliary chamber A2 = 2.5
Volume of liquid L = 2
Travel = T = 6 units
Initial Internal pressure = 100 PSI
Piston Diameter = 1 square unit.
(see note re: units in TABLE TWO above)

Exemplary Physical Embodiment

FIGS. 9A-F depict various views of an exemplary physical embodiment of valving that may be used with the gas spring 5 previously schematically shown in FIG. 6 (i.e., having two auxiliary chambers). This exemplary physical embodiment is generally similar to the gas spring control valve described in the '403 application and therefore reference should be made to that application for detailed structural and operational descriptions.

The major differences between the current exemplary physical embodiment and that of FIGS. 2-10 of the '403 application concerns modifications needed to allow liquid to flow with minimal restriction through the various flow ports that were previously designed only to accommodate gas flow. In the '403 application, where only gas was used, flow ports 40, 45 had an exemplary diameter on the order of 0.050" when unrestricted gas flow between the various gas chambers was desired.

In the current invention, however, liquid and gas must be able to flow through the flow ports 40, 45 at a rate commensurate with potentially large stroke velocities.

To achieve these large liquid flow capabilities, the gas spring control valve of FIGS. 2-10 of the '403 application may be modified in any way that allows increased liquid flow rates.

For example, the cross-sections of flow ports 40, 45 may be significantly increased. By increasing, for example, the cross-section from 0.050" ('403 application) to 0.187" (current exemplary embodiment), flow area increases by a factor of about 14 times.

Figure 9C:
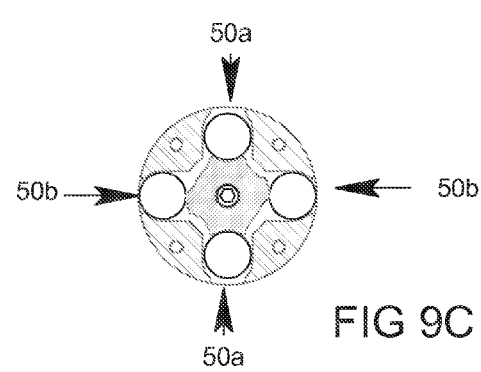
Figure 9E:
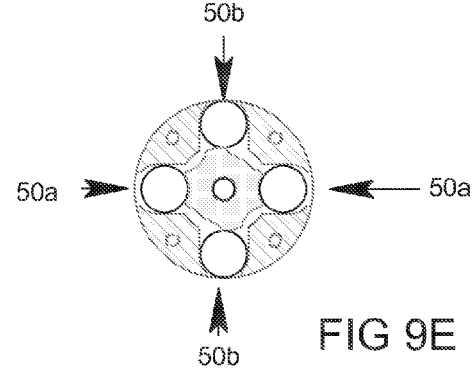
Figure 10A:
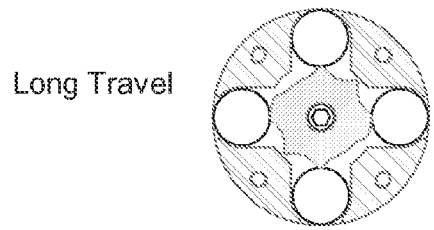
FIGS. 10A-D depict the gas spring control valve of FIGS. 9A-F in its various operative settings.
Figure 10B:
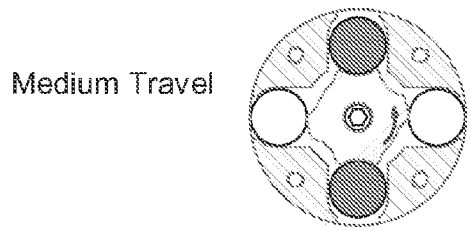
Figure 10C:
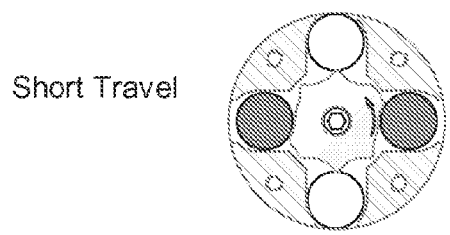
Figure 10D:
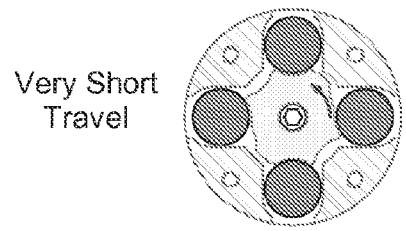

To accommodate these larger flow ports 40, 45, body portion 25 may need to be modified. For example, a body portion extension 25e may be provided between first end 25a of body portion 25 and partition 35. The width of extension 25e is only slightly larger than the flow port diameters. Additionally, to further contribute to reduced pressure drops while accommodating the larger fluid flows, instead of there being only one of each flow port 40, 45, according to an exemplary embodiment of the invention, there may two of each flow port. This allows greater flow volumes and lower pressure drops. Accordingly, there may be a pair of first ball valves 50a and a pair of second ball valves 50b (FIGS. 9C, 9E).

FIGS. 10A-D depict the operation of the control valve in a similar manner as described in the '403 application. In particular, the valve produces four different valve settings that may produce the four different travel modes, as described above and in the '403 application.

Alternative Exemplary Physical Embodiment

As shown in FIGS. 15-16 of the '403 application, gas spring curve control valve 20 may comprise a rotary disc valve rather than ball valves. Reference should be made to the '403 application for a complete description of the structure and operation of the rotary disc valve. As shown in FIGS. 11A-14C herein, the rotary disc valves of the '403 application may also be applied to the current invention and in different configurations.

Figure 11B:
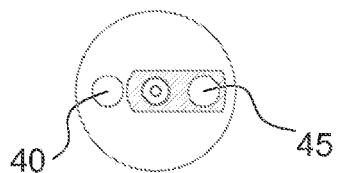
FIGS. 11A-B depict another exemplary physical embodiment of a gas spring control valve according to the invention.
Figure 12A:
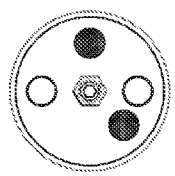
FIGS. 12A-D depict the gas spring control valve of FIGS. 11A-B in its various operative settings.
Figure 12B:
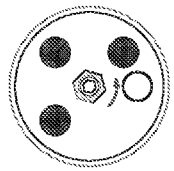
Figure 11A:
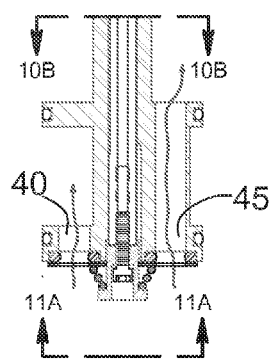
Figure 12C:
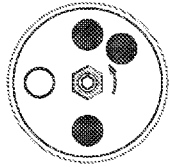
Figure 12D:
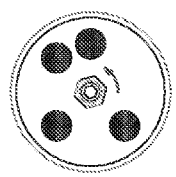

For example, in FIGS. 11A-11B, herein, the structure of FIGS. 15-16 of the '403 application is shown—with the modification that the diameters of flow ports 40, 45 are made larger for the reasons previously described above. As in the '403 application, four different valve settings are provided that are 45 degrees apart (FIGS. 11A-D).

Figure 13:
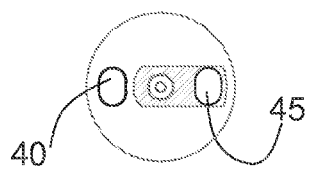
FIG. 13 depicts another exemplary physical embodiment of a gas spring control valve according to the invention.
Figure 14A:
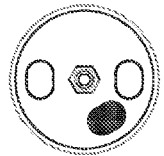
FIGS. 14A-C depict the modified gas spring control valve of FIG. 13 in its various operative settings.
Figure 14B:
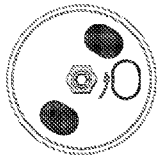
Figure 14C:
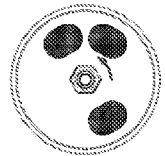

In FIG. 13, 14A-C, a compromise is made between the number of different valve settings and the capacity for liquid flow (i.e., liquid flow rate). Specifically, one of the four different valve settings and its associated travel mode are eliminated. As an example, the travel mode setting that may be removed could be the one where the main chamber and the first auxiliary (lower) chamber are in fluid communication. The elimination of the valve setting opens up additional angular space on body 25 so flow ports 40, 45 may be made oblong, or "kidney-shaped" (FIG. 13-14). The oblong flow ports 40, 45 provide for approximately 50% more flow rate than the related circular flow ports. Therefore, if a designer is designing a gas spring that may be regularly subjected to larger impacts, this embodiment of the present invention offers the design option of eliminating one of the travel settings in favor of oblong ports to accommodate larger fluid flows.

Negative Gas Spring

FIG. 15 depicts an exemplary embodiment of the invention including an exemplary negative gas spring N that biases the gas spring towards the compressed position. The negative gas spring may be applied to any of the previously described exemplary embodiments of the invention. The use of negative gas springs is generally described in, for example, U.S. Pat. No. 6,135,434 (Marking); U.S. Pat. No. 6,311,962 (Marking); U.S. Pat. No. 6,360,857 (Fox); and U.S. Pat. No. 6,105,988 (Turner).

According to the exemplary embodiment of FIG. 15, piston stop 14 may be made into an annular piston stop disk 14'. Piston rod 13 may freely translate through the bore in the annular piston disk 14', but the surface of the piston rod is sealed against the annular piston stop disk 14', such as by use of an o-ring 15. Finally, a pressurized gas N' may be inserted into the spring chamber 68 defined between piston bottom 12' and a top surface 14a of annular piston stop disk 14'. The gas may be inserted into spring chamber 68 using, for example, a conventional gas valve 69 (shown schematically) in combination with a gas port 70 in piston rod 13. One skilled in the art, using, for example, the teachings of the patents mentioned immediately above in combination with the exemplary pressures mentioned throughout the present application would then be able to determine the pressure of gas N' to tune the overall gas spring 5 to a desired performance.

CONCLUSION

While the invention has been described with respect to certain exemplary embodiments, the scope of the invention shall only be limited by the appended claims.

LIST OF REFERENCE NUMERALS USED

| | |
|---|---|
| 5, 5' | gas spring |
| 10 | gas spring housing |
| 11 | upper end of gas spring housing |
| 12 | piston |
| 12' | piston bottom |
| 13 | piston shaft |
| 14 | piston stop |
| 14' | annular piston stop disk |
| 14a | top of annular piston stop disk |
| 15 | seal |
| 20, 20a, 20b | control valve |
| 25 | body portion |
| 25a | first end of body portion |
| 25e | body portion extension |
| 35, 35a, 35b | partition |
| 40 | first flow port |
| 45 | second flow port |
| 50 | ball valve |

-continued

LIST OF REFERENCE NUMERALS USED

| | |
|---|---|
| 67 | knob |
| 68 | negative gas spring chamber |
| 69 | gas valve |
| 70 | gas port |
| A1, A2 | auxiliary chambers |
| C | main chamber |
| G | gas |
| L | liquid |
| N | negative gas spring |
| N' | negative gas spring gas |

The invention claimed is:

1. A gas spring for a two-wheeled vehicle, comprising:
a main chamber;
at least one auxiliary chamber, wherein said main chamber is fillable with a volume of liquid, and wherein said at least one auxiliary chamber comprises:
a first auxiliary chamber and a second auxiliary chamber;
a first flow port disposed between said main chamber and said first auxiliary chamber, said first flow port enabling a first fluid flow between said main chamber and said first auxiliary chamber;
a first valve for movably blocking said first flow port;
a second flow port disposed between said main chamber and said second auxiliary chamber, said second flow port enabling a second fluid flow between said main chamber and said second auxiliary chamber;
a second valve for movably blocking said second flow port;
pressurized gas that fills said at least one auxiliary chamber and a remaining portion of said main chamber; and
a movable piston that compresses said pressurized gas in said main chamber and that displaces said liquid during a compression stroke of said gas spring.

2. The gas spring of claim 1, further comprising:
a control valve that controls whether said main chamber and said at least one auxiliary chamber are in fluid communication with each other, wherein said control valve controls movement of said first valve and said second valve.

3. The gas spring of claim 2, further comprising:
a partition that separates said main chamber from said at least one auxiliary chamber, wherein said partition comprises said control valve.

4. The gas spring of claim 2, wherein a knob positioned externally of said gas spring is coupled with and is in rotational communication with said control valve, wherein said control valve is bi-directionally movable.

5. The gas spring of claim 2, wherein said control valve comprises:
at least three valve settings.

6. The gas spring of claim 5, wherein a first valve setting of said at least three valve settings comprises:
a long travel mode, wherein when in said long travel mode, said first valve is not blocking said first flow port such that said first fluid flow is enabled and said second valve is not blocking said second flow port such that said second fluid flow is enabled.

7. The gas spring of claim 5, wherein a second valve setting of said at least three valve settings comprises:
a medium travel mode, wherein when in said medium travel mode, said first valve is blocking said first flow port such that said first fluid flow is not enabled and said second valve is not blocking said second flow port such that said second fluid flow is enabled.

8. The gas spring of claim 5, wherein a third valve setting of said at least three valve settings comprises:

a short travel mode, wherein when in said short travel mode, said first valve is not blocking said first flow port such that said first fluid flow is enabled and said second valve is blocking said second flow port such that said second fluid flow is not enabled.

9. The gas spring of claim 5, wherein a fourth valve setting of said at least three valve settings comprises:

a very short travel mode, wherein when in said very short travel mode, said first valve is blocking said first flow port such that said first fluid flow is not enabled and said second valve is blocking said second flow port such that said second fluid flow is not enabled.

10. The gas spring of claim 1, wherein said first valve and said second valve comprise:

a first pair of ball valves and a second pair of ball valves, respectively.

11. The gas spring of claim 1, wherein said first valve and said second valve comprise:

a rotary disc.

12. The gas spring of claim 2, wherein said control valve comprises:

three valve settings, and wherein said first flow port and said second flow port are each of an oblong shape.

* * * * *